United States Patent
Tyni et al.

(10) Patent No.: US 6,776,264 B2
(45) Date of Patent: Aug. 17, 2004

(54) METHOD FOR ALLOCATING LANDING CALLS

(75) Inventors: Tapio Tyni, Hyvinkaa (FI); Jari Ylinen, Hyvinkaa (FI)

(73) Assignee: Kone Corporation, Helsinki (FI)

( * ) Notice: Subject to any disclaimer, the term of this patent is extended or adjusted under 35 U.S.C. 154(b) by 0 days.

(21) Appl. No.: 10/743,035

(22) Filed: Dec. 23, 2003

(65) Prior Publication Data

US 2004/0134717 A1 Jul. 15, 2004

Related U.S. Application Data

(63) Continuation of application No. PCT/FI02/00616, filed on Jul. 5, 2002.

(30) Foreign Application Priority Data

Jul. 6, 2001 (FI) .................................................. 011484

(51) Int. Cl.[7] .............................................. B66B 1/18
(52) U.S. Cl. ...................... 187/382; 187/247; 187/391
(58) Field of Search ................................ 187/380, 382, 187/385, 386, 387, 388, 397, 399, 391, 394, 247, 248; 706/13, 21, 902, 903, 910

(56) References Cited

U.S. PATENT DOCUMENTS

| 5,780,789 A | | 7/1998 | Tsuji |
| 5,907,137 A | * | 5/1999 | Tyni et al. .................. 187/382 |
| 5,932,852 A | * | 8/1999 | Tyni et al. .................. 187/382 |
| 6,293,368 B1 | * | 9/2001 | Ylinen et al. ............... 187/382 |
| 6,644,442 B1 | * | 11/2003 | Ylinen et al. ............... 187/382 |
| 2004/0040791 A1 | * | 3/2004 | Tyni et al. .................. 187/382 |
| 2004/0060776 A1 | * | 4/2004 | Tyni et al. .................. 187/380 |

FOREIGN PATENT DOCUMENTS

| GB | 2241090 A | * | 8/1991 | .......... B66B/01/20 |
| JP | 06156893 A | * | 6/1994 | .......... B66B/01/18 |
| WO | WO 96/33123 A1 | | 10/1996 | |
| WO | WO 99/33741 A2 | | 7/1999 | |

* cited by examiner

*Primary Examiner*—Jonathan Salata
(74) *Attorney, Agent, or Firm*—Birch, Stewart, Kolasch & Birch, LLP

(57) ABSTRACT

The object of the invention is to achieve a new solution for allocating landing calls to the elevators in an elevator group so that the control call received by each elevator changes as seldom as possible. This is achieved via genetic allocation by using the allocation option selected in the preceding instance of allocation as one chromosome in the starting chromosome population in a new instance of allocation.

11 Claims, 1 Drawing Sheet

METHOD FOR ALLOCATING LANDING CALLS

Figure 1:
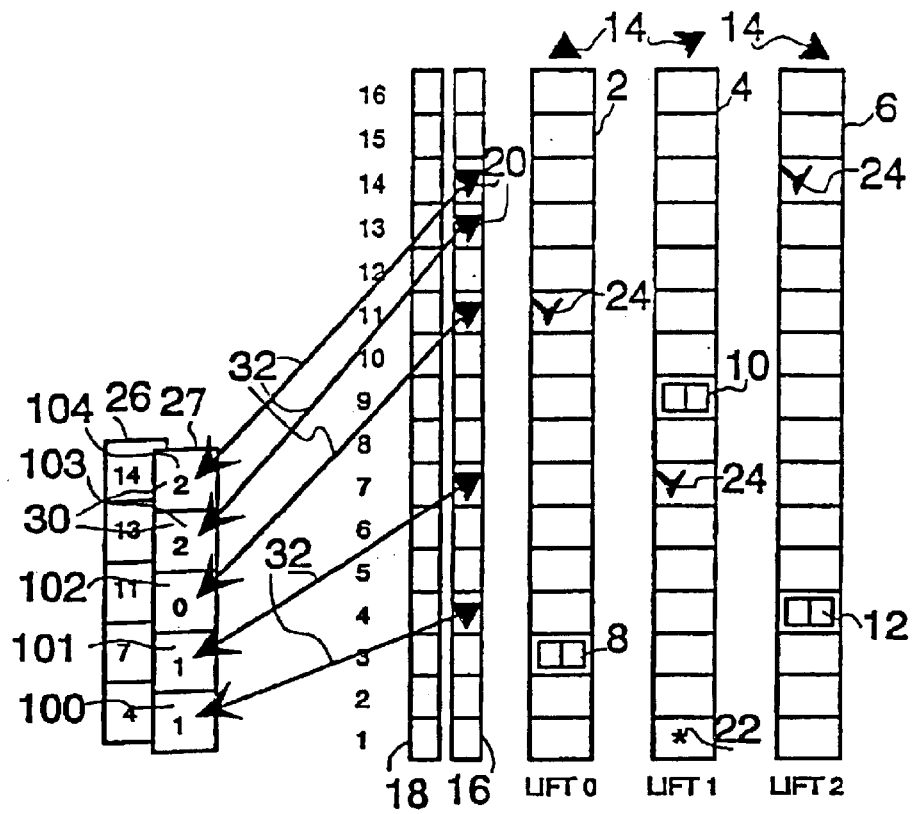

This Nonprovisional application claims priority under 35 U.S.C. § 119 (a) on patent application Ser. No(s). 20011484 filed in Finland on Jul. 6, 2001, and this application is a Continuation of copending PCT International Application No. PCT/FI02/00616 filed on Jul. 5, 2002, which designated the United States, and on which priority is claimed under 35 U.S.C. § 120, the entire contents of which are hereby incorporated by reference.

SUBJECT OF THE INVENTION

The present invention relates to a method and an apparatus for allocating calls given via the landing call devices of elevators comprised in an elevator group so that each call is served by one elevator in the elevator group. In particular, the invention relates to a method for stabilizing repeatedly defined allocation decisions in an allocation system based on a genetic algorithm.

PRIOR ART

When a passenger wants a ride on an elevator, he calls an elevator by pressing a landing call button on the floor. The elevator group control system receives the call and tries to decide which one of the elevators in the elevator group will be best suited to serve the call. This activity is call allocation. The allocation function is a kind of minimization problem in which, as a solution to the function, the aim is to find an elevator that minimizes the value of the function on the basis of one or more selected cost factors.

When the number of calls and elevators serving them increases, the minimization problem becomes significantly more complicated. This naturally increases the amount of computation capacity required. The quantity to be minimized in the allocation process may be passenger waiting time, passenger traveling time, number of stops of the elevators, or a combination of several cost factors weighted in different ways.

Traditionally, when a suitable elevator is to be found for a call, the reasoning is performed on a case-specific basis using complicated conditional structures. The final objective of this reasoning is to minimize a given cost factor describing the operation of the elevator group, typically the average passenger waiting time. Since the possible combinations of states of the elevator group are complex, the conditional structures are also complex and apt to have gaps, in other words, there occur situations in which the control does not work in an optima way. Likewise, it is difficult to take the entire elevator group into account as a whole. A typical example of this is the traditional collective control, in which a landing call is allocated to the elevator nearest to it and traveling in the direction of the call.

However, this simple optimization principle leads to a grouping of the elevators so that the elevators travel in a front in the same direction, and therefore to a deterioration of the performance of the elevator group as a whole.

When the cost factors for all possible route alternatives are to be determined, the required amount of computing work easily grows beyond the capacity of the processors. If the number of calls to be served is C and the building has L elevators, then the number of different route alternatives is $N=L^C$. As the number of route alternatives increases exponentially with increase of the number of calls, systematic consideration of all route alternatives is impossible even in small elevator groups. This has restricted the practical application of route optimization.

Finnish patent application FI 951925 discloses a method for allocating landing calls in an elevator group. This method is based on forming a plurality of allocation options, each of which contains call data and elevator data for each landing call, said data together defining the elevator which is to serve the landing call. After this, the value of a cost function is computed for each allocation option and one or more allocation options are altered in respect of one or more data items comprised in it, whereupon the values of the cost functions of the new allocation options thus obtained are computed. In this way, on the basis of the cost functions, the best allocation option is selected and the currently active landing calls are allocated accordingly to the elevators of the elevator group.

The solution according to FI 951925 substantially reduces the required computation work as compared with calculating all possible route alternatives. In a method based on a genetic algorithm like this, the elevator group is treated as an entity, the cost function being optimized at the level of the entire elevator group. The optimization can be performed without considering individual situations and ways of coping with them. By modifying the cost function, a desired mode of operation can be achieved. It is possible to optimize e.g. passenger waiting time, call time, number of starts, traveling time, energy consumption, rope wear, operation of an individual elevator if the use of a given elevator is expensive, uniform use of the elevators and so on, or a desired combination of these.

If there are a large number of active landing calls, a single solution or allocation option that is clearly better than other options will not necessarily be found. To this situation, there are several solutions that are almost equally good. This is a case of so-called multi-modality.

As the above-described genetic algorithm is a search method of a stochastic nature, it does not guarantee that a search repeated over and over again will always produce the same solution or allocation option, even if the same or almost the same starting values are used. In the case of continuous allocation, this appears as an instability of allocation decisions. The calls allocated to the elevators in the elevator group change from one time of allocation to another. However, if it is known that there are several approximately equally good allocation options for the elevator group, then it does not make a difference which one of these allocation options is used. By contrast, it is important that the allocation option should not be altered each time the allocation option is selected again, but that a solution once selected should be retained as long as the starting parameters of allocation remain identical or sufficiently identical.

In practice, this means that, if the situation in the elevator group remains unchanged, i.e. no more calls are received and no elevators are added or removed from the group, then the elevator routes selected for a given set of calls have to be retained until even the last call has been served. If this is not the case, then an elevator in the elevator group may receive new control data every half second, which is cumbersome for the elevator to implement and leads to instability of the elevator group and the system.

The object of the invention is to disclose a new type of allocation method.

A specific object of the invention is to eliminate the above-mentioned drawbacks of prior-art allocation methods or at least to provide a substantial improvement to them.

A further alternative object of the invention is to disclose an allocation method that is substantially more stable and reliable than prior-art methods.

A further alternative object of the invention is to make it possible to stabilize the solution of an allocation problem and elevator group control so that an unchanged or almost unchanged set of calls is served by an unchanged allocation option as long as the allocation option in question produces a solution that is one of the best solutions obtained by a stochastic selection process.

As for the features characteristic of the invention, reference is made to the claims.

BRIEF DESCRIPTION OF THE INVENTION

The object of the invention is to achieve a new solution for allocating landing calls to the elevators in an elevator group in such a way that the control call received by each elevator changes as seldom as possible.

In the genetic method of the invention, to allocate calls to the elevators in the elevator group, several allocation options, i.e. chromosomes are generated, each of which contains for each active landing call a call data item and an elevator data item, and these data items or genes together determine the elevator that is to serve each landing call. For each chromosome generated, a fitness function value is determined. Next, one or more of the chromosomes are altered in respect of at least one gene, and fitness function values are determined for the chromosomes thus obtained. The search, i.e. the generation of new chromosomes is continued until an agreed termination condition is met, whereupon the best chromosome is selected on the basis of the fitness function values and the calls are assigned according to this solution to the elevators in the elevator group. Call allocation can be repeated frequently, depending on different factors. In practice, the cycle of repetition of allocation may be half a second or even shorter if necessary.

In the method of the invention, before a new search for a call allocation decision or a new allocation cycle is started, the best chromosome selected before is added to the set of chromosomes to direct the selection result to the best chromosome selected before when the starting conditions of allocation are substantially unchanged.

In the method of the invention, a set of allocation options, i.e. chromosomes form a generation, from which generally the best ones are selected for reproduction to produce a new generation of chromosomes. The new generation is formed from the selected chromosomes by means of a genetic algorithm via selection, cross-breeding and/or mutation.

The procedure of the invention can be continued until the desired target is reached, i.e. e.g. until a given fitness function value has been reached or until a given number of new generations have been formed, or the procedure can be interrupted upon the lapse of a given processing time. Another termination criterion that may be applied is sufficient homogeneity of the population.

In the method of the invention, the best chromosome is added to the first generation before a new generation is formed. The best chromosome may also be added to the second generation or to one of the subsequent generations before the formation of a new generation. In addition, the fitness function value of the best chromosome of the preceding cycle may be multiplied by a constant K, which preferably is smaller than unity, thus modifying the value of the fitness function. After that, the chromosome provided with the modified fitness function is added to the set of chromosomes.

If an "overgood" individual or chromosome is added to the population during a new search cycle, i.e. at a new time of allocation, this increases the stability of allocation decisions made via genetic allocation. Simply because an "overgood" solution is the final result of the preceding allocation cycle, it causes premature convergence of the population, in other words, it directs the population towards the solution of the preceding cycle. According to relevant literature describing genetic allocation, premature convergence is harmful expressly because an overgood individual getting into the starting generation dominates the search for the best alternative by communicating its genes to the population, with the result that the population does not reach a solution to the set problem. However, the invention expressly aims at reaching the solution of a previous cycle if the starting values are the same or about the same.

The solution of the invention provides an excellent solution for the stabilization of allocation decisions. If the situation in the elevator group remains unchanged so that no additional calls are received and no elevators are removed from or added to the group, then the elevator routes already found should be retained long enough. On the other hand, if new calls appear in the system or the elevator situation changes, then the form of the search space also changes, and a previously selected good solution is no longer the best solution or one of the best solutions in the search space. It is a poor solution among other poor solutions included in the starting generation via the selection process.

The solution of the invention substantially reduces randomness in the selection of the best allocation alternative for the elevators in an elevator group. By applying the invention, it is possible to implement an integrated mechanism for stabilizing elevator control decisions in an elevator control system that uses genetic allocation. In addition, the invention makes it possible to introduce a controlled hysteresis mechanism.

LIST OF DRAWINGS

Figure 2:
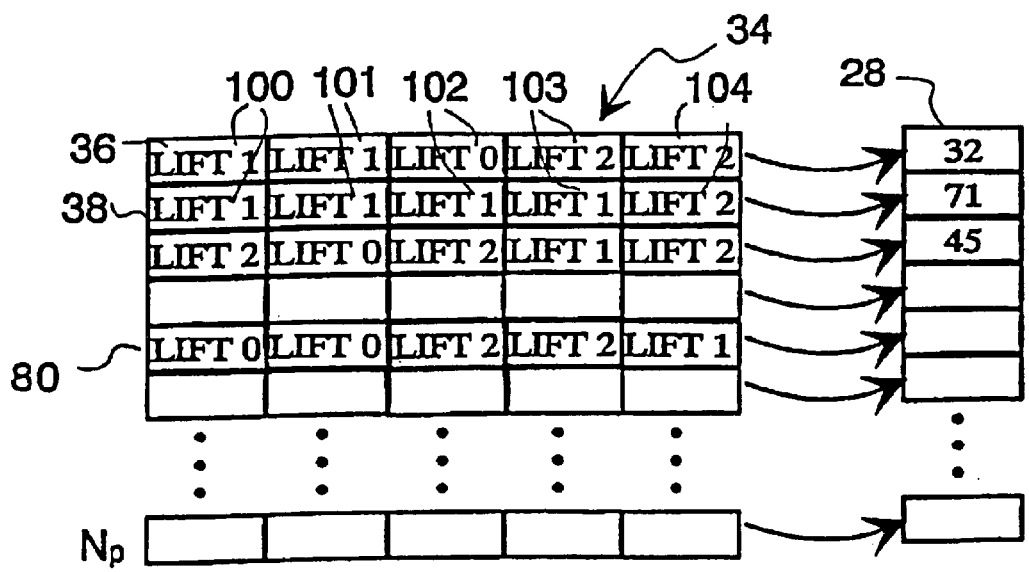

In the following, the invention will be described in detail by the aid of an embodiment example with reference to the attached drawings, wherein FIG. 1 illustrates the formation of an elevator chromosome, FIG. 2 represents a starting chromosome population according to the invention.

FIG. 1 is a diagram representing the floors of a building, which are numbered 1, 2, 3 . . . , 16. The elevator group comprises three elevators LIFT0, LIFT1 and LIFT2, which move in shafts 2, 4 and 6 and whose elevator cars are correspondingly indicated by reference numbers 8, 10 and 12. The elevator cars are located at floors 3, 9 and 4 and their traveling direction is indicated by arrow symbols 14 shown above the shaft, according to which elevator cars 8 and 12 are moving in the up direction and elevator car 10 is moving in the down direction.

Beside the shafts there are columns 16 and 18 for active landing calls for the down direction and the up direction. Landing calls are represented by arrow symbols 20. An asterisk symbol indicates a car call issued from elevator car 10 to floor 1. Arrow symbols 24 indicate floors from which landing calls have been issued and an elevator car has been allocated to the calls. Accordingly, the landing call from floor 11 has been allocated to elevator LIFT0, the landing call from floor 7 has been allocated to elevator LIFT1 and the landing call from floor 14 has been allocated to elevator LIFT2.

Columns 26 and 27 visualize the formation of an allocation option when an elevator chromosome is used, one gene corresponding to each landing call. Column 26 shows the active landing calls in order, the highest floor number being placed topmost and the lowest floor number bottommost in the example in FIG. 1. Column 27 contains the actual elevator chromosome, which, corresponding to the number of landing calls, consists of five genes 30, which contain information regarding the elevator serving the call. For each landing call there is one gene. Arrows 32 visualize the formation of a gene. According to elevator chromosome 27 and gene 102, elevator LIFT0 serves the call from floor 11. According to genes 100 and 101, elevator LIFT1 serves the calls from floors 4 and 7, and similarly, according to genes 103 and 104, elevator LIFT2 serves calls 13 and 14. During the formation of the elevator chromosome, the active landing calls in the up and down directions are encoded so that the position of the gene in the elevator chromosome carries information about a landing call. After allocation has been performed, the information of the elevator chromosome is decoded to corresponding landing calls.

FIG. 2 presents the principle of genetic allocation after the formation of a chromosome. From the chromosomes, a population 34 comprising a selected number $N_p$ of elevator chromosomes is generated. The chromosomes $1-n_p$, which are possible allocation alternatives for the existing calls, correspond to the situation illustrated in FIG. 1, i.e. there are five down-calls from floors 4, 7, 11, 13, 14 to be served. At first, each gene in the chromosomes comprised in the population 34 is given a random elevator number or advance information is utilized if available. Further, according to the invention, the genes of one chromosome 80 are assigned the values of the genes of the chromosome selected on the preceding allocation cycle, in order from left to right LIFT0 LIFT0 LIFT2 LIFT1. At this point, let it be noted that this is only an example of the selection chromosome values and does not necessarily represent the best alternative in the case of FIG. 1.

Further, the other chromosomes in the population are also given gene values by selecting them at random or by using a previously known selection criterion. Application FI 951925 contains a detailed description of the calculation and use of the fitness function 28 in allocation and in the selection of the best chromosome. Therefore, we shall not describe it in detail in the present application.

In the foregoing, the invention has been described by referring to examples of its preferred embodiments. However, the invention is not intended to be limited to these examples, but instead many variations are possible within the sphere of protection of the claims presented below.

What is claimed is:

1. Method for allocating calls issued by means of the landing call devices of the elevators in an elevator group, in which method the allocation of landing calls comprises the steps of:

forming a set of allocation options, i.e. chromosomes, each of which contains call data and elevator data for each landing call currently active, determining a fitness function value for each chromosome, and selecting the best chromosome on the basis of a termination criterion and assigning the landing calls according to this chromosome, to be served by the elevators in the elevator group, and characterized in that, when landing call allocation is repeated, as the set of chromosomes is being formed, the best chromosome selected in a previous instance of allocation is added to the set of chromosomes to direct the selection result towards the previously selected best chromosome when the starting conditions of allocation are substantially unchanged.

2. Method according to claim 1, characterized in that the best chromosome selected in a previous instance of allocation is provided with the fitness function value computed for it in the previous instance of allocation.

3. Method according to claim 1, characterized in that the previous instance of allocation is the instance of allocation preceding the present instance of allocation.

4. Method according to claim 1, characterized in that the fitness function value of the best chromosome is multiplied by a constant K to form a modified fitness function value, and the chromosome, provided with a modified fitness function, is added to the set of chromosomes.

5. Method according to claim 4, characterized in that the constant K is given a value smaller than unity.

6. Method according to claim 4, characterized in that the hysteresis of allocations is adjusted by varying the value of the constant K.

7. Method according to claim 1, characterized in that the chromosomes form a generation, from which a new generation is formed by means of a genetic algorithm via selection, cross-breeding and/or mutation.

8. Method according to claim 7, characterized in that the best chromosome is added to the first generation before the formation of a new generation.

9. Method according to claim 7, characterized in that the best chromosome is added to the second or a subsequent generation before the formation of a new generation.

10. Method according to claim 1, characterized in that, in the search for a chromosome that meets the termination criterion, one or more chromosomes are mutated in respect of at least one gene and the fitness function values of the chromosomes thus obtained are determined, chromosome mutations are repeated until the termination criterion is met.

11. Method according to claim 10, characterized in that the termination criterion is met when a predetermined fitness function value, number of generations, processing time or a sufficient homogeneity of the population is reached.

* * * * *